Aug. 19, 1958  L. F. LYONS  2,848,614
REGULATED POWER SUPPLY
Filed April 16, 1956  2 Sheets-Sheet 1
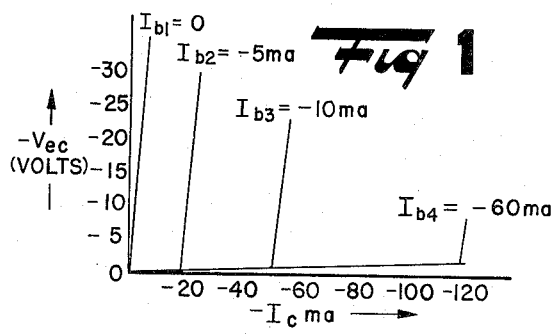
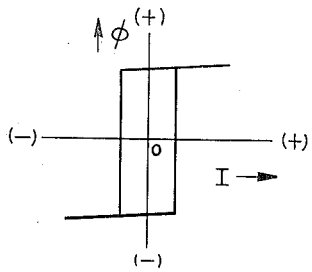
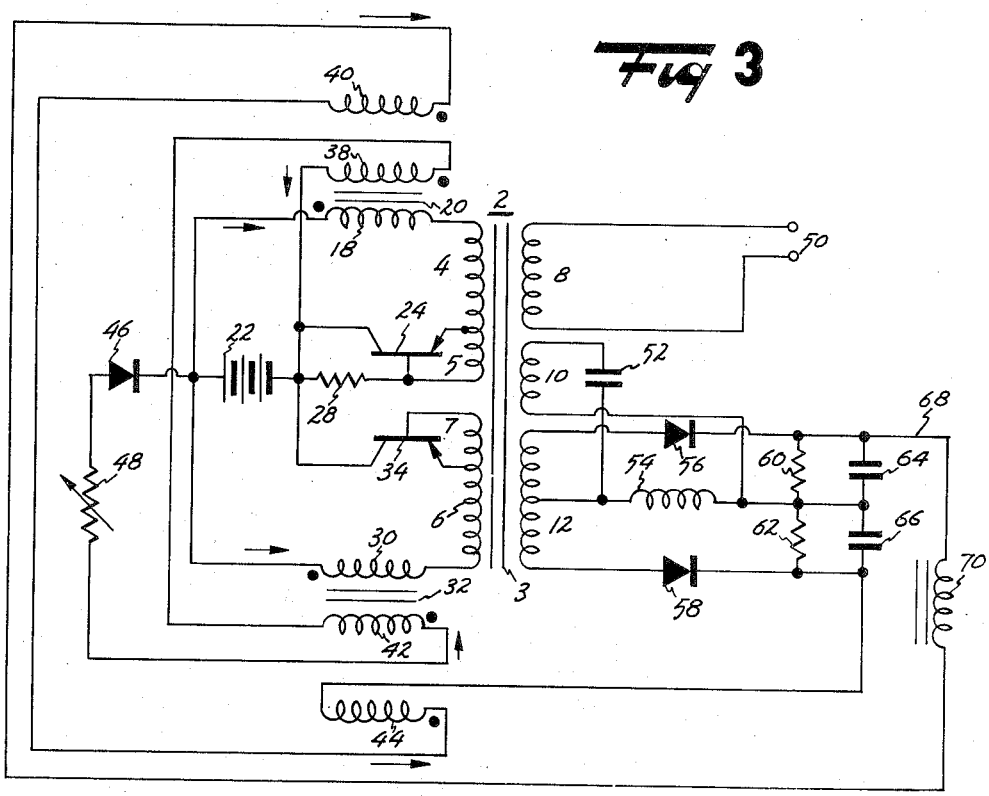
INVENTOR.
LAMBERT F. LYONS
BY
ATTORNEY Aug. 19, 1958  L. F. LYONS  2,848,614
REGULATED POWER SUPPLY
Filed April 16, 1956  2 Sheets—Sheet 2

INVENTOR.
LAMBERT F. LYONS
BY
ATTORNEY

United States Patent Office 2,848,614
Patented Aug. 19, 1958

2,848,614

REGULATED POWER SUPPLY

Lambert F. Lyons, Burbank, Calif., assignor to Bendix Aviation Corporation, North Hollywood, Calif., a corporation of Delaware Application April 16, 1956, Serial No. 578,464

14 Claims. (Cl. 250—36)

This invention relates to power supply systems for supplying voltage-regulated direct-current power or frequency-regulated alternating-current power from a direct-current power source.

It has previously been proposed to utilize a pair of transistors inductively intercoupled by a saturable-core transformer to form a multivibrator for converting direct-current power into alternating-current power. In one such multivibrator, certain windings of a transformer apply control signals to the transistors, and the transistors function as a switching system to control the voltages applied to other windings of the transformer. By reason of this interconnected control between the transistors and the transformer, the system will oscillate freely and form an alternating-current output. This alternating-current output may be essentially rectangular-shaped waves, which can be rectified to form a relatively smooth direct-current voltage with little or no filtering. Converter systems of this type may, therefore, be seen to be useful for changing direct current of one voltage to direct current of another voltage as well as for converting direct current into alternating current.

In converter systems of this type, variations in load and input voltage cause variations in the magnitude and frequency of the output voltage. There is, therefore, need for a converter of this general class wherein the voltage magnitude and the frequency of the output may be regulated or controlled.

Briefly, the present invention is a system for regulating the power from a converter which utilizes semi-conductor devices, e. g., transistors, in conjunction with a saturable-core transformer.

Either the frequency or the voltage magnitude of the output power may be regulated or controlled.

An object of this invention is to provide an improved system of regulation for a free-running multivibrator converter of the type discussed.

Another object is to provide improved frequency control in a direct-to-alternating current converter of this type.

Another object is to provide improved voltage control in a system of the type discussed for converting direct-current voltage of one magnitude to direct-current voltage of another magnitude.

Other and incidental objects and features of the invention will appear from the following description with reference to the drawings in which:

Fig. 1 is a reference diagram showing the operating characteristics of a junction transistor of a type that may be used in the described embodiments of the invention.

Fig. 2 is a hysteresis loop of a magnetic core material that may be used in the described embodiments of the invention.

Fig. 3 is a schematic circuit diagram of a system in accordance with the invention.

Prior to consideration of the mode of operation of the described embodiments of this invention, certain components which may be utilized to practice the invention will be considered.

Figure 5:
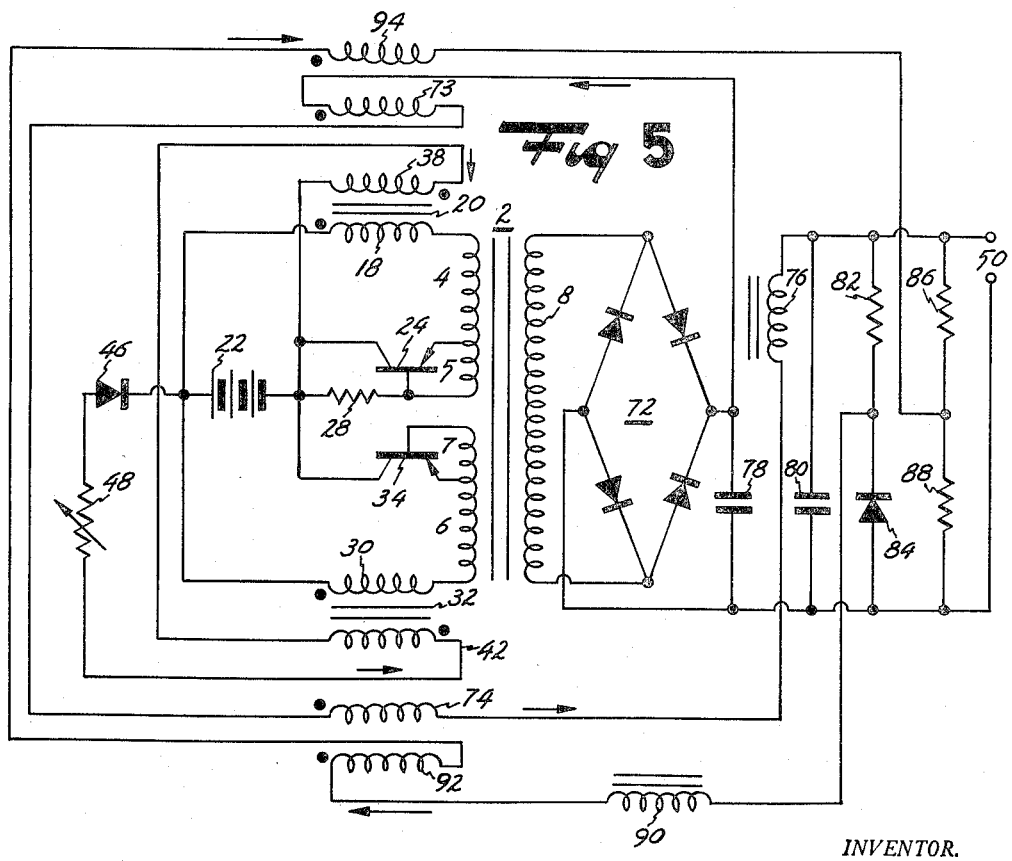
Fig. 5 is a schematic circuit diagram of another system in accordance with the invention.

Operation of a junction transistor, as used in the systems of Figs. 3 and 5, will first be considered. Fig. 1 is a family of curves $I_{b1}$—$I_{b4}$, which are graphic representations of the operating characteristics of a semi-conductor device, i. e., a PNP junction transistor, having base, emitter, and collector electrodes. The voltage between the emitter and the collector electrodes of a transistor is plotted as ordinate, and the current passing through the collector electrode is plotted as abscissa. The different curves $I_{b1}$—$I_{b4}$ are plotted with different values of current passing through the base electrode.

The curves $I_{b1}$—$I_{b4}$ indicate that when the current $I_b$ (through the base electrode) is low, as shown by the curve $I_{b1}$, large variations in the voltage $V_{ec}$ (applied between the collector and emitter electrodes) will cause essentially no variations in the collector current $I_c$. If, however, the current $I_b$ is increased negatively to a value as shown by the curve $I_{b4}$, then small increments in the voltage $V_{ec}$ (applied between the emitter and the collector electrodes) will be accompanied by large increases in the collector current $I_c$. Therefore, if the current $I_b$ is shifted between the values of the curves $I_{b1}$—$I_{b4}$, the transistor will act as a switch to make and break contact between the emitter and collector electrodes. In other words, a PNP junction transistor, when operated as a switch, will present little resistance (between the collector and emitter electrodes) if the base electrode is more negative than the emitter electrode. A high resistance, however, will be presented if the base electrode is more positive than the emitter electrode.

Consider now Fig. 2, which shows a plot of electrical current $I$ as abscissa and magnetic flux $\phi$ as ordinate, to form an essentially rectangular hysteresis loop of a saturable-magnetic material. The magnetic characteristics of the material described by the hysteresis loop of Fig. 2 render this material well-suited to form the saturable cores used in the systems of Figs. 3 and 5.

In Fig. 3 there is shown a transformer 2 having windings 4, 5, 6, 7, 8, 10, and 12 mounted upon a core 3 formed of material having an essentially rectangular hysteresis loop. One terminal of the winding 4 is connected to a winding 18 which is mounted upon a saturable core 20, and is in turn connected to the positive terminal of a battery 22. The other terminal of the winding 4 is connected to an emitter electrode of a PNP junction transistor 24 and to the winding 5. The winding 5 is in turn connected to the base electrode of the transistor 24 to control the transistor 24. The collector electrode of the transistor 24 is connected to the negative terminal of the battery 22. A resistor 28 is connected between the base electrode of the transistor 24 and the negative terminal of the battery 22 and serves to create an unbalance in the system to initiate oscillation.

One terminal of the winding 6 is connected through a winding 30, mounted on a saturable core 32, to the positive terminal of the battery 22. The other terminal of the winding 6 is connected to the emitter electrode of a PNP junction transistor 34. The winding 7 is connected between the emitter and base electrodes of the transistor 34 and controls the state of the transistor 34. The collector electrode of the transistor 34 is connected to the negative terminal of the battery 22.

The cores 20 and 32 are formed of rectangular-hysteresis-loop material and carry windings 38 and 40 and windings 42 and 44, respectively. The dot notation on these windings indicates that the flux formed by windings 38 and 40 is of a different polarity from the flux formed by the winding 18 when current flows in the indicated directions.

A connection is made from the positive terminal of the battery 22 through a voltage-regulating silicon diode 46, a variable resistor 48, and the windings 42 and 38 to the negative terminal of the battery 22.

Consideration will first be made of the multivibrator action of the basic inductively-coupled transistor multivibrator system. Operation of a similar multivibrator is shown and described in an article beginning on page 322 of the July 1955 issue of a magazine entitled "Communication and Electronics," published by the American Institute of Electrical Engineers.

During each half cycle of the operation of the system, one of the transistors 24 or 34 will be conducting while the other will be non-conducting. The transistors thus alternate from a conducting state to a non-conducting state. The currents through the transistors 24 and 34 energize the core 3 with flux of opposite polarity; therefore, the core 3 will repeatedly be magnetized with flux of a different polarity. Due to this changing flux in the core 3, an alternating voltage will be induced in the windings of the transformer 2.

Assume that at one stage of the operation of the multivibrator, the current in the base electrode of the transistor 24 is such as to cause the transistor 24 to provide a low-resistance path between the collector and emitter electrodes. During this time, a current will flow from the positive side of the battery 22 through the winding 18, the winding 4, the transistor 24, and back to the battery 22. The effect of the winding 18 on this current will not be considered at this time. This current increases at a linear rate determined by the circuit characteristics, until the core 3 becomes saturated with magnetic flux. After saturation of the core 3, several effects occur almost simultaneously: First, this current rises sharply to the saturation level of the transistor 24, where the resistance of the transistor 24 limits further current increase. The induced voltage in the winding 5 then drops to zero, due to the fact that the current in the winding 4 is stable, and the flux in the core 3 is no longer changing. With the absence of an induced voltage in the winding 5, no control voltage is applied to the base electrode of the transistor 24, to create a control current through the base electrode. With the disappearance of the base control current, the current through the transistor 24 (between the collector and emitter electrodes) decreases. The decrease of the current between the collector and emitter electrodes of the transistor 24 induces small voltages in the windings 5 and 7 which are opposed to those previously induced, and which tend to cause the transistor 24 to become more cut-off, and to cause the transistor 34 to conduct. These induced voltages then increase until the transistor 24 is completely cut-off, at which time the transistor 34 begins to conduct and carry an increasing current until saturation occurs. Upon saturation of the transistor 34, the cycle will repeat.

Thus, at the instant of connection (by the switching transistor 24) of the battery 22 to the winding 4, the flux in core 3 starts building up at a rate determined by the potential of battery 22 and the inductance of the winding 4. It may be assumed that the voltage of the battery 22 is constant and that the inductance of the winding 4 is constant until the core 3 saturates. Therefore, the flux in the core builds up at a constant rate to the saturation level and suddenly stops, inducing in the winding 8 the positive half of the square potential wave A in Fig. 4. The succeeding energization of winding 6 generates the negative half of the potential wave in the same manner. It is important to note that the length or duration of each half wave, and hence the frequency of oscillation of the system, is determined by the rate of build-up of the flux in the core 3, which rate varies with the input potential applied to the windings 4 and 6 and the output current to the load. As the input potential is reduced, the output square waves are lengthened, and the output frequency reduced; also, the amplitude of the output wave is reduced, since it is a function of the rate of change of the flux. Therefore, if either the input voltage or the output load varies, the frequency and voltage at the output will change.

The rate of flux build-up in the core 3 may be controlled to compensate for these changes by altering the impedance in the current paths containing the windings 4 and 6. The windings 18 and 30 in conjunction with the saturable cores 20 and 32 provide variable impedance means in these current paths. The windings 18 and 30 on the cores 20 and 32 will either present essentially no impedance or a large impedance, depending upon whether the cores 20 or 32 are saturated or unsaturated with magnetic flux, as indicated in Fig. 2. The windings 38 and 40 and the windings 42 and 44 are, therefore, used to vary the flux in the cores 20 and 32, and thereby alter the impedance presented by the windings 18 and 30.

During any half cycle of operation, two rates of flux build-up may be made to occur in the core 3, depending upon whether the core 20 or 32 carrying the winding in which current flows to build-up flux in the core 3 is saturated or unsaturated. A low rate of flux build-up prevails until one of the cores 20 or 32 is saturated; then an increased rate of flux build-up occurs to complete the half cycle. Figs. 4B and 4C show stepped waveforms of the voltage output from the system of Fig. 3 at a time when the saturable cores 20 and 32 are not saturated until the cycle is partly complete. The step increase in the voltage waveforms occurs at the instant when one of the cores 20 or 32 becomes saturated and the rate of flux build-up increases. At this time, the winding 18 or 30 will present no appreciable impedance, causing all the available voltage to be placed on either the winding 4 or 6 to create an increased rate of flux build-up.

Fig. 4C schows a stepped voltage waveform formed when the cores 20 and 32 do not reach saturation as rapidly as during the operation illustrated by the curve of Fig. 4B. That is, the curve of Fig. 4A shows the voltage-output waveform when the cores 20 and 32 are saturated at all times. The waveform of Fig. 4B shows the voltage output when the cores 20 and 32 are saturated during a portion of the operating cycle, and the waveform of Fig. 4C indicates an operating mode when the cores 20 and 32 are saturated over a smaller portion of the operation cycle.

The portions of the stepped voltage waveforms in Figs. 4B and 4C which appear above the reference line contain the same area as the portion of the waveform of Fig. 4A appearing above the reference line. This is true because a predetermined amount of flux build-up is required to drive the transistors to saturation regardless of the rate of build-up, and during such a build-up a predetermined area or volts-time under a voltage waveform will result. This constant area requirement of the system enables frequency variations in the output signal.

Figure 4:
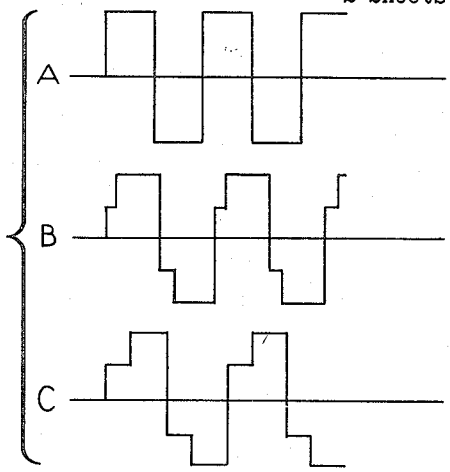
Fig. 4 is a diagram showing waveforms occurring within the described embodiments of the invention.

Further consideration of the curves of Fig. 4 indicates that in a predetermined time, the curve 4A completes two cycles, the curve of Fig. 4B does not quite complete two cycles, and the curve of Fig. 4C completes only slightly more than one and one-half cycles. Fig. 4 thus illustrates that varying the rate of flux build-up in the core 3 varies the frequency of an alternating-current output from the system.

In the operation of the system of Fig. 3, the current in the windings 18 and 30 will, ordinarily, eventually saturate the cores 20 and 32 with magnetic flux. Therefore, the polarity of the flux formed in the cores 20 and 32 by the windings 18 and 30 will be considered as saturation polarity. The greater the current in either the windings 38 or 40, or the windings 42 or 44, in the indicated direction, the greater will be the flux opposed to the flux of saturation polarity. Therefore, if the flux opposed to saturation polarity is increased, the flux of saturation polarity must be raised to a higher level to saturate the cores 20 and 32. This will have the effect of delaying the period when a higher rate of flux build-up exists and thereby increasing the duration of the lower step in the waveforms as shown in Figs. 4B and 4C. As the lower step is increased in time duration, the output frequency is decreased; therefore, output frequency will vary inversely as the flux in the cores 20 and 32 which is opposite to saturation polarity. Such a flux will be produced in the cores 20 and 32 when currents flow in the windings 38, 40, 42, and 44 in the directions indicated.

The windings 38 and 42 provide an initial bias flux to set the flux level in the cores 20 and 32 to a state which may be varied in frequency in either direction. A waveform similar to that shown in Fig. 4B will thus be formed. The biasing current to provide this flux is controlled by the diode 46 and the resistor 48, which may be set to provide for various operating conditions. The silicon diode 46 is a voltage-regulating diode, and is operated at its zener voltage to operate consistently with temperature variations, to increase the bias current considerably with increases in voltage by the power supply. That is, the resistance of the diode 46 will vary depending upon the voltage applied across it, similar to a voltage-regulating vacuum tube.

During operation, a current will flow from the positive terminal of the battery 22 through the diode 46 (in an inverse fashion) through the resistance 48, the windings 42 and 38 and back to the negative terminal of the battery 22. In the event of an increase in the supply voltage, as represented by the battery 22, the frequency of operation of the system will increase as previously explained. Assuming such a voltage increase, the diode 46 will conduct more heavily, thereby increasing the flux formed by the windings 38 and 42 which is opposed to the flux of saturation polarity. As the increase in flux opposes flux of saturation polarity, saturation of the cores 20 and 32 will be delayed to reduce the increase in frequency resulting from the assumed increase in the supply voltage.

Considering the waveforms of Fig. 4, to illustrate this operation, an increase in the supply voltage will shift the operation output waveform from that shown in Fig. 4B toward that shown in Fig. 4C. This change will tend to decrease the frequency and compensate for the increased frequency resulting from the increased supply voltage.

In addition to the frequency control to compensate for variation in power supply, an additional frequency control is provided by the discriminator circuit which senses variations from a desired frequency and couples a signal back to compensate accordingly.

The winding 8 of the transformer 2 is connected to output terminals 50 at which alternating-current output power will appear. The output from the windings 10 and 12 of the transformer 2 is coupled into a frequency discriminator circuit. The winding 10 is connected in a series loop with a condensor 52 and an inductance 54. The inductance 54 is also connected to a center tap on the winding 12. The end terminals of the winding 12 are connected individually to diodes 56 and 58 which are in turn connected to parallel resistance-capacitance circuits formed of resistors 60 and 62 and capacitors 64 and 66. These resistance-capacitance circuits are then connected back to the center tap of the winding 12. The output from the discriminator circuit appears in the line 68 and is passed through an inductance filter 70, the winding 40 and 44, and back to the discriminator.

The frequency discriminator circuit is of a standard type used in various electronic applications. The capacitor 52 and the inductance 54 are resonant at the desired frequency. At a time when the output voltage is at the desired frequency, the diodes 56 and 58 receive voltages of the same magnitude, and zero output results. If, however, the frequency appearing in the winding 12 increases (or decreases), then the voltages induced in the winding 12 will be added to (or subtracted from) the voltage appearing in the inductance 54, and because of the phase relationships existing between the two voltages in the secondary circuit, one of the diodes 56 and 58 will then have a higher voltage applied to it than the other. Voltage summation then occurs in the resistances 60 and 62 to result in a control signal which varies in magnitude and polarity as the frequency variation from the desired frequency output of the system. The condensors 64 and 66 are provided across the load resistors 60 and 62 to remove alternating signals approaching the frequency output of the system. If the frequency of the output signal increases, a positive direct current will flow through the filtering inductor 70 to the windings 40 and 44 which are inductively coupled to the cores 20 and 32 respectively. This current, in the direction indicated, will increase the flux opposing the flux of saturation polarity, thereby prolonging the period when the cores 20 and 32 are unsaturated, and increasing the period of reduced rate of flux build-up in the core 3, resulting in an output waveform as shown in Fig. 4C. The waveform of Fig. 4C being of a reduced frequency, the assumed frequency increase will be compensated.

A decrease in the output frequency will produce a negative current in the windings 40 and 44 (opposed to that indicated). The negative current in the windings 40 and 44 will produce a flux which aids the flux of saturation polarity. The cores 20 and 32 therefore become saturated at a point earlier in each half cycle, and the period of a reduced rate of flux build-up in the core 3 is reduced, resulting in a controlled frequency increase. It may therefore be seen that the windings 40 and 44 in conjunction with the windings 38 and 42 will compensate for frequency variations which would otherwise occur in the system of Fig. 3 to provide a frequency-stable alternating-current power output.

Reference will now be had to Fig. 5 which shows a system for regulating the magnitude of the output voltage from a converter system. Components in Fig. 5, having a similar function as components in Fig. 3, carry like reference numerals.

Prior to considering the mode of operation of the system of Fig. 5, to provide a regulated voltage output, reference will again be made to Fig. 4, the waveforms of which are also representative of outputs from the system of Fig. 5. Fig. 4A shows a rectangular waveform appearing at the output from the multivibrator system, i. e., winding 8, which occurs when the cores 20 and 32 are saturated at all times. As previously explained, variation of the flux in the cores 20 and 32 will change the waveform as shown by Fig. 4A to waveforms as shown by Figs. 4B and 4C. Full wave rectification of the waveform shown in Fig. 4A will provide a direct current which is essentially flat. Rectification of voltages represented by the waveforms of Figs. 4B and 4C, however, will provide a pulsating direct-current voltage superimposed upon a flat direct-current voltage. The length of the intervals between the pulses coincides with the length of the lower step in the waveform and may therefore be controlled by varying the flux in the cores 20 and 32, as previously explained. In the event that the cores 20 and 32 are saturated during a relatively small portion of the cycle, an output waveform similar to that shown in Fig. 4C will be formed. This waveform when rectified and filtered will result in a lower direct-current voltage than the waveforms of Figs. 4A and 4B. Therefore, the magnitude of the direct-current voltage may be controlled by varying the mode of operation between the different waveforms shown in Fig. 4.

To provide a direct-current voltage, the output of the basic converter of Fig. 5, described with reference to Fig. 3, is rectified and filtered. To accomplish this, the winding 8 is connected to a full wave bridge rectifier 72, which is in turn connected to a filter consisting of windings 73 and 74, a reactance 76, and capacitors 78 and 80. The output from this filter is applied to a resistance 82 serially connected with a voltage regulating silicon diode 84. The silicon diode 84 is utilized as a voltage regulator, and is operated at its zener voltage such that its operation is relatively immune from temperature variations. The output from the filter is also applied to a voltage divider consisting of resistances 86 and 88. The voltage appearing across the silicon rectifier 84 is applied through a filter reactance 90 to windings 92 and 94 which are mounted upon the cores 20 and 32. The voltage across the resistance 88 of the voltage divider circuit is then applied to windings 94 and 92 in opposition to the reference level voltage developed across the silicon diode 84. These opposing connections result in magnitude comparison of the two voltages. The reactance 90 minimizes the effect of induced A. C. voltages in windings 82 and 84.

The operation of the system of Fig. 5 will provide a voltage-regulated direct-current voltage having a magnitude different from the battery 22.

The output of the multivibrator of Fig. 5 would, if uncompensated, tend to vary with variations in the supply voltage as represented by the battery 22, in the manner previously explained. However, these variations are compensated (in addition to the compensation produced by the reference diode 84 and windings 92 and 94) by the action of the windings 38 and 42 on the cores 20 and 32, also as previously explained.

Assume, for example, an increase in the magnitude of the supply voltage for purposes of explanation. This increase will result in an increased current through the windings 38 and 42 in the direction indicated. This current increase will result in an increase of flux in the cores 20 and 32 which is opposed to the flux of saturation polarity. Opposing the flux of saturation polarity results in a step in the output voltage, as shown in Fig. 4C, which has an increased time duration. Therefore, upon rectification, a reduced magnitude of direct-current voltage will be formed. Of course, decreases in the supply voltage will be compensated in a similar manner.

The output of the system will also tend to drop in voltage when increased currents are supplied. The output current of the system is sensed by the windings 73 and 76 which are included in the direct-current filter and through which all output current flows. If the load across the terminals 50 increases, then an increased current will pass through the windings 73 and 76 in the indicated direction. This increase in current will form an increased amount of flux in the cores 20 and 32 which will be of saturation polarity. Increasing the flux of saturation polarity in the cores 20 and 32 has the effect of bringing about the saturation more rapidly and reducing the duration of the lower step in the output waveform as shown in Fig. 4B. The result is an increase in the rectified direct-current voltage which compensates for the drop incurred by the load increase. Again, opposite variations will be similarly compensated.

Another and the most predominant means for regulating the output voltage is controlled directly by the magnitude of the output voltage itself. The voltage divider consisting of the resistances 86 and 88 is so arranged that at the time when the desired voltage appears at the output terminals from the system, a voltage similar to that appearing across the terminals of the voltage regulating silicon diode 84 will appear across the resistance 88. In the event that the output voltage decreases, then the voltage across the resistance 88 will also decrease, and a current will flow from a cathode of the silicon diode 84, through the windings 92 and 94, to the resistances 88 in the direction indicated. This current flow in the windings 92 and 94 will form a flux in the cores 20 and 32, of saturation polarity. This flux will aid in the flux formed by the windings 18 and 30 and will tend to drive the cores 20 and 32 to saturation faster, resulting in an increased direct-current voltage from the system upon rectification. In the event that the voltage across the resistance 88 becomes greater than the voltage across the selenium diode 84, then a current will pass through the windings 94 and 92 in an opposite direction to that indicated, tending to drive the output of the system into a waveform more nearly as shown in Fig. 4C to reduce the output voltage.

It may therefore be seen that the invention provides a system for regulating the power output from a converter system, either as to frequency or voltage and for sensing variations in the energy output from such a system and regulating such an output either in frequency or voltage.

Although for the purpose of explaining the invention, a particular embodiment thereof has been shown and described, obvious modifications will occur to a person skilled in the art, and I do not desire to be limited to the exact details shown and described.

I claim:

1. A power supply system comprising: a semi-conductor switching system operable between two states; a saturable core transformer having at least a first and a second winding inductively coupled; means for energizing said first winding in one manner when said semi-conductor switching system is in one state, and in another manner when said semi-conductor switching system is in another state; means coupling said second winding to said semi-conductor switching system such as to control the state of said semi-conductor switching system; an output circuit adapted to be energized under control of said semi-conductor switching system; signal-controlled means connected in series with said first winding for varying the current through said first winding; and means for forming a control signal which varies as signals in said output circuit; means coupling said control signal to said signal-controlled means to vary the current in said first winding according to said output signal.

2. A system according to claim 1 wherein said signal controlled means comprises saturable core reactance means for controlling current according to said controlled signal.

3. A system according to claim 1 wherein said means for forming a control signal comprises means for detecting variations in the voltage of signals in said output circuit.

4. A power supply comprising: first and second semi-conductor devices; inductive coupling means for intercoupling said semiconductor devices to form an inductively coupled multivibrator; an output circuit adapted to be connected to a source of energy such as to be energized under control of said semiconductor devices; a frequency discriminator for forming a control signal which varies as the frequency appearing in said output circuit; control means for controlling said inductive coupling means for varying the effective intercoupling between said semi-conductor devices; and means for applying said control signal to said control means to vary the effective intercoupling between semi-conductor devices according to the frequency appearing in said output circuit.

5. A power supply comprising: first and second semi-conductor devices; inductive coupling means for intercoupling said semiconductor devices to form an inductively-coupled multivibrator; an output circuit adapted to be connected to a source of energy such as to be energized under control of said semi-conductor devices; means for detecting the energization of said output circuit to form a control signal; a saturable reactance network for varying the effective intercoupling between said transistor devices by regulating the amount of electrical current utilized to intercouple said transistor devices; and means for applying said control signal to said control means to vary the effective intercoupling between said semi-conductor devices according to the energization of said output circuit.

6. A power supply system comprising: a semiconductor switching system operable between two states; a saturable core transformer having at least a first and a second winding inductively coupled; means for energizing said first winding in one manner when said semi-conductor switching system is in one state, and in another manner when said semi-conductor switching system is in another state; means coupling said second winding to said semi-conductor switching system such as to control the state of said semi-conductor switching system; an output circuit adapted to be energized under control of said semi-conductor switching system; signal-controlled means for varying the current through said first winding; means for forming a control signal in response to variations in the frequency of signals in said output circuit; and means coupling said control signals to said signal-controlled means to vary the current in said first winding according to said output signal.

7. In combination: a source of direct current, a transformer having a plurality of windings, circuit means including first and second potential-responsive switching devices respectively connecting said source to different windings of said transformer in multivibrator fashion such that said transformer is successively energized from said source in opposite polarities at a repetition rate determined by the inductance of said circuit means and said windings; said circuit means including variable inductance means connected in series with at least one of said different windings for selectively varying said repetition rate.

8. Apparatus according to claim 7 in which said transformer has a saturable core.

9. Apparatus according to claim 7 in which said variable inductance means comprises a coil on a saturable core; and means for varying the current level in said coil at which said core saturates.

10. Apparatus according to claim 9 in which said last-mentioned means comprises another coil on said saturable core, and means for energizing said other coil with a control current.

11. Apparatus according to claim 10 in which said last-mentioned means comprises means connecting said source of direct current to said other coil in opposing polarity to said first-mentioned coil.

12. Apparatus according to claim 10 in which said means for energizing said other coil comprises frequency-discriminating means connected to and energized by said transformer for generating an output direct current varying with deviation of said repetition rate from a predetermined rate.

13. Apparatus according to claim 10 in which said means for energizing said other coil comprises: rectifying means connected to and energized by said transformer for producing a unidirectional output potential; and means responsive to variations in said output potential from a predetermined magnitude for generating said control current.

14. Apparatus according to claim 11 including: a third coil on said saturable core; means connected to and energized by said transformer for generating an output direct current varying with deviation of said repetition rate from a predetermined rate; and means for variably energizing said third coil in accordance with said output current.

References Cited in the file of this patent

UNITED STATES PATENTS 2,748,274    Pearlman               May 29, 1956